Oct. 25, 1949.　　　　E. A. FURKERT　　　　2,486,017
GAS MIXER
Filed Oct. 18, 1946　　　　　　　　　　　　2 Sheets-Sheet 2
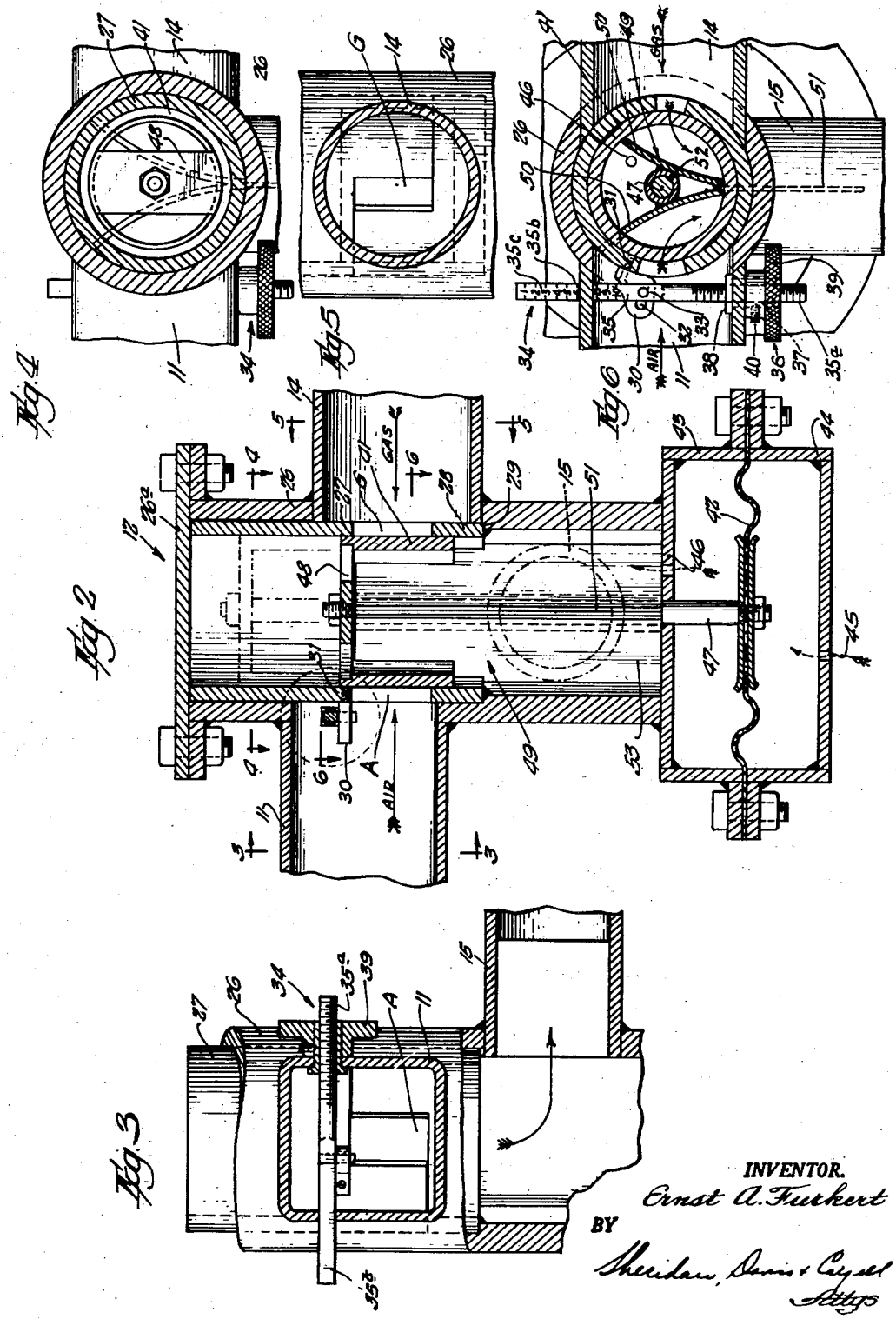
INVENTOR.
Ernst A. Furkert
BY
Sheridan, Ross & Geyset
Attys Patented Oct. 25, 1949

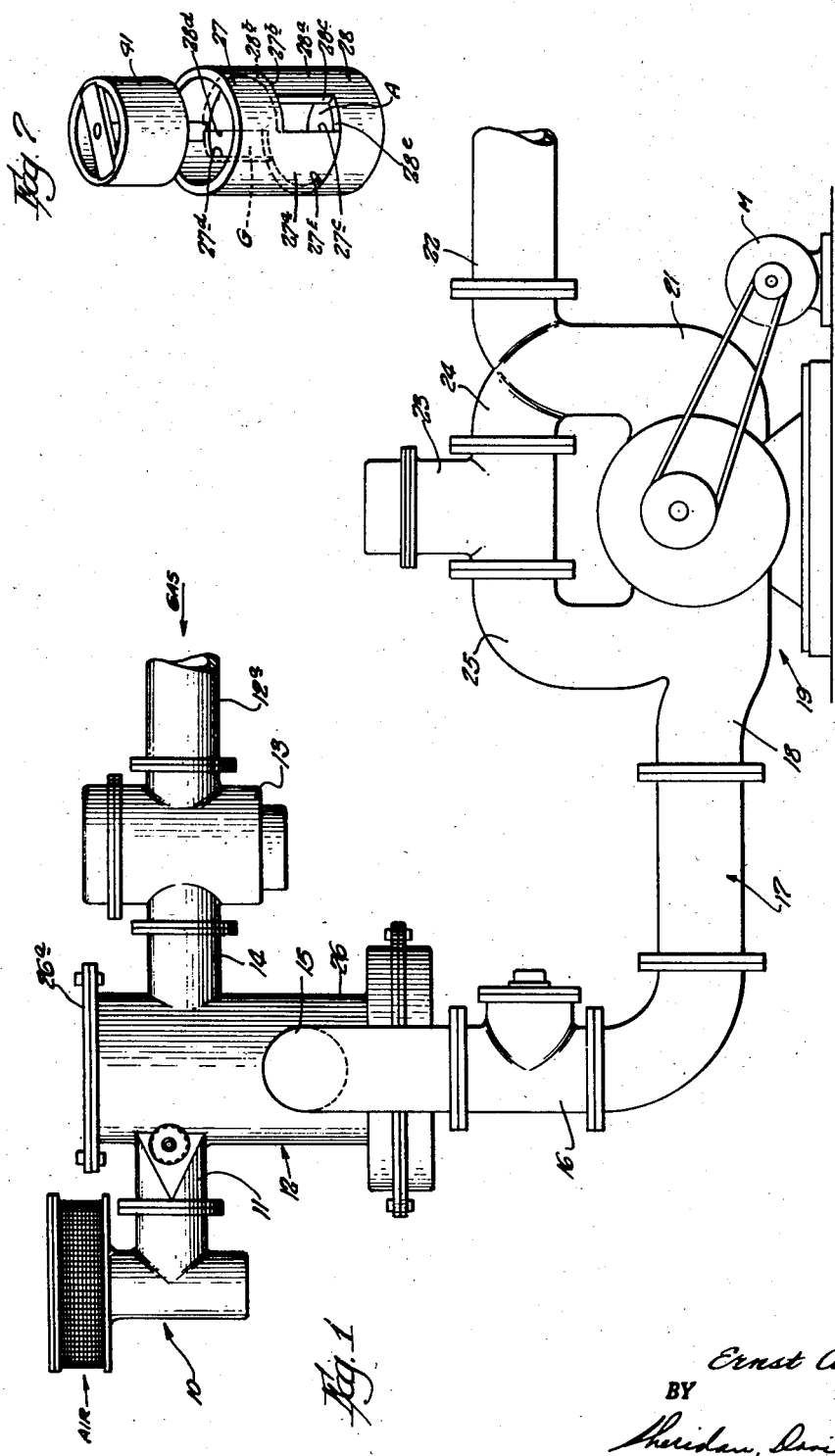

2,486,017

UNITED STATES PATENT OFFICE 2,486,017

GAS MIXER

Ernst A. Furkert, Chicago, Ill.

Application October 18, 1946, Serial No. 703,927

9 Claims. (Cl. 48—184)

1

This invention relates to improvements in gas mixers.

In the industrial use of fuel gas, it has been common practice for many years to pre-mix the gas with air before the gas reaches the burners where additional air may be added by the Bunsen burners to provide a suitable combustible mixture. Modern gas mixing machines not only mix the gas with selected proportioning of air, but they also are provided frequently with air cleaners, means for controlling the pressure of gas as it enters the mixers and means associated with compressors for maintaining the mixed air and gas at a selected constant pressure in the delivery lines leading to the burners. The accessory parts of such gas-air mixing machines are of various types or structures. The present improvements relate to that unit or part of the machine which effects proportioning of the air and gas which, as a mixture, goes to the burners as above stated.

An object of the present invention is to provide a gas mixer which, by reason of simplicity of structure, permits ready adjustment for selected air-gas ratios without the necessity of packings to avoid leakage of excess air into the chamber, and without utilizing devices requiring the use of lock nuts for securing the parts in adjusted positions and which makes possible the use of a simple sliding valve that in operation determines the quantity of air and gas admitted to the machine, in response to the demand for fuel, and which valve has merely a reciprocating or up and down movement in use.

An additional object of the invention is to provide, in a gas mixer, a gas-air proportioning means that is of simple construction and economical to manufacture and which is provided with adjusting means for varying the air-gas ratio without removing parts such as closure plates or the like from the casing.

Another object of the invention is to provide a gas mixer that can be adjusted for varying the air-gas ratio during operation of the machine, to thereby adjust the gas-air ratio to compensate for varying or different conditions, such as variations in proportions of the gas constituents that may obtain during operation of the mixing machine.

An additional object of the invention is to provide a gas-air mixer that directs the air and gas in a downward direction within the intake or proportioning chamber thereby producing a scavenging or cleansing action that more effectively prevents the accumulation of dust and other particles upon the chamber walls whereby

2 the improved machine requires less frequent shut downs for cleaning than would otherwise be required.

Other objects of the invention relate to various features of construction and arrangement of parts which will be apparent from a consideration of the following specification and accompanying drawings wherein Figure 1 is a side elevation, that may be considered diagrammatic, showing a gas-air mixing machine embodying the present improvements;

Fig. 2 is an enlarged vertical sectional view of the gas-air proportioning mechanism of the mixer;

Fig. 3 is a sectional view taken on line 3—3 of Fig. 2 illustrating means for adjusting a sleeve device to positions controlling the proportioning of the air-gas mixture;

Fig. 4 is a sectional view taken on line 4—4 of Fig. 2;

Fig. 5 is a sectional view taken on line 5—5 of Fig. 2;

Fig. 6 is a sectional view taken on line 6—6 of Fig. 2;

Fig. 7 is a detached perspective view of the gas proportioning and valve mechanism.

In the drawings wherein a structure is shown that is illustrative of the invention, an air cleaner 10 is shown through which air that is to be mixed with gas in selected proportions enters the machine. The cleaner structure per se is no part of the present invention and may be of any approved type. The air entering the cleaner passes through a nipple 11 into the air-gas proportioning member indicated by the reference numeral 12. Gas from a source of supply, such as a city gas main, is conducted to the machine by a duct 12a and flows into a gas governor 13. The governor is of any suitable structure and reduces the pressure of the delivered gas to that of the incoming air, such as atmospheric pressure. The gas at the reduced pressure flows from the governor 13 through a nipple 14 into the gas proportioning member 12. The air and gas entering the member 12 are proportioned as desired by the adjustment of a ratio selecting means forming a part of the member 12 (as will later be described in detail), whereby the air and gas to be mixed in the selected ratios are conducted downwardly from the respective intake nipples to an outlet duct 15 within which the air and gas streams commingle and pass through check valve 16 (the use of which is optional and the construction of which is conventional) and thence through a conduit 17 to the intake or suction side 18 of a compressor or blower indicated generally by numeral 19. The construction of the compressor or blower may be conventional, and is operated, usually at a constant velocity, by any suitable source of power, such as electric motor M, and forces the mixed air-gas stream through an outlet 21 into a duct 22 that conveys it to the burners, not shown. The suction side 18 of the blower being connected to the duct 17 causes the air and gas to enter the proportioning member 12 through the respective nipples 11 and 14 at the same pressure since the governor 13 reduces the pressure of the incoming gas to that of the air which usually is at atmospheric pressure. However, as will be pointed out below, the quantity of the air and gas that actually passes through the member 12 in a given period or time unit and thus makes up the fuel stream flowing to the compressor is determined by the adjustment of the ratio selecting means forming a part of the proportioning device 12. The compressor 19 is shown as provided with a pressure control 23 which may be of conventional construction and maintains a constant or selected pressure of the fuel mixture in the duct 22. The pressure control illustrated is of the by-pass type and when set to maintain the fuel in line 22 at a certain pressure effects the by-passing of excess gas from the compressor outlet or delivery side 21 to the intake side 18 via the duct connections 24 and 25 respectively. The general structure above described delivers gaseous fuel (a mixture of air and gas or gases) into the duct 22 which conducts the fuel to the burners of a furnace or other gas consuming apparatus and delivers it at a constant or selected pressure, as determined by the pressure control 23. The structures of the gas control and compressor are well known and need not be shown in detail.

Referring to Figs. 2 to 6, inclusive, the improved gas proportioning device 12 comprises an outer tubular casing 26 provided with the air and gas intake nipples 11 and 14, respectively, above described. The nipples are shown on opposed sides of the casing 26 while outlet 15 is shown at an elevation lower than the intake nipples and disposed at substantially right angles thereto. The angles of entrance of the air and gas into the proportioning chamber, may be varied if desired but the location of the outlet 15 below the levels of the air and gas intakes is desirable in that the downward flow of the air and gas through the member 12 produces a more effective scavenging action than where the relative elevations are reversed, or where the entrance and exit ports are all in a single horizontal plane.

Positioned within the casing 26 is a cylindrical sleeve comprising a movable upper section 27 and a stationary lower section 28. The sections 27 and 28 may be formed of metal tubing, such as bronze, of the proper gauge and diameters and are of the form shown in Fig. 7. The sections 27 and 28 are shown positioned in an enlarged or counter bored upper portion of the casing, the lower section 28 seating on the ledge or shoulder 29 and secured against relative movement by any suitable means, such as brazing or staking to the casing 26. The lower section 28, as shown in Fig. 7, has a portion removed to provide an upstanding semi-cylindrical portion 28a having a horizontal upper edge 28b, two vertical edges 28c, 28d, and a horizontal edge 28e. The lower end of the section 27 is somewhat complementarily shaped in that it has a depending semi-cylindrical portion 27a, a horizontal upper edge 27b that contacts edge 28b, two vertical edges 27c, 27d that are arranged to cooperate with edges 28c, 28d respectively, in defining the variable horizontal widths of the inlet ports, and a lower horizontal edge 27e that contacts the edge 28e of member 28. The horizontal edges 27b, 28b, and 27e and 28e provide sliding surfaces that interfit or closely contact to exclude passage of air or gas between them. The arcuate extent of portions 27a and 28a, are together, less than 360°, thereby forming two ports of variable capacity for the admission of air and gas, the air port being indicated by letter A and the gas port by letter G. As will be seen in Fig. 7, moving sleeve section 27 about a vertical axis in a clockwise direction will reduce the area of port G and increase the area of port A while counter-clockwise movement will increase the area of the port G and reduce the area of the port A. By the simple structure, the air and gas admitted into the machine through the nipples 11 and 14 can be proportioned as desired since by rotating the sleeve 27 the maximum distance counter-clockwise, as viewed in Fig. 7, the air port A can be completely closed and the gas port G opened to the maximum extent, while reverse movement of the sleeve to the maximum extent reverses the relative areas of the valve ports. Intermediate positions of adjustment provide relative port areas corresponding to the positions of adjustment of the sleeve. The capacities of ports A and G being inversely variable, that is, the closing of one correspondingly opens the other, make it possible to control the relative areas or capacities of the ports by a single adjusting means.

An important feature of the present construction is the convenience with which the sleeve 27 can be adjusted for selecting the air-gas ratio without removing the closure 26a of the casing 26 and hence during operation of the machine. The sleeve 27 is provided, in the form shown, with an arm 30 that projects radially into the nipple 11, as shown in Fig. 2, being secured thereby by screws 31 or the like after assembly of the sleeve section 27 in the casing 26. The arm 30 has a slot 32 therein into which projects a pin or stud 33 carried by an adjusting member 34 shown as comprising a rod 35 that has a cylindrical forward threaded portion 35a and a rear portion 35b that is rectangular in cross section and is provided with graduation or indicia 35c that indicate relative positions of angular adjustment of the sleeve 27 and hence of the relative adjustments of the reversely operable ports A and G. The threaded end 35a of the bar 35 extends through a two part adjusting nut 36 comprising a threaded sleeve 37 having a flange 38 at the inner end. The sleeve extends through an opening in the nipple 11 (shown as rectangular in cross section) and on the exterior is provided with a knurled finger grip member 39. The sleeve and grip member are shown secured together by a set screw 40. Rotation of the nut 36 advances or retracts the bar axially thus swinging the arm 30 and effecting arcuate movement of the sleeve 27 in a direction to adjust the openings of ports A and G the extent required to provide the desired proportions of air and gas.

When the ports are open a like extent, the quantities of air and gas that will flow through the ports, in a unit of time, are equal since, as above stated, the pressures of the air and gas are equal and they are caused to move through the ports under the suction effect of the compressor.

While the air-gas ratio is set to give selected proportions making up the fuel mixture, the rate of the fuel consumption may not be continuously uniform. In other words, the demand for fuel may change from time to time and hence means are provided which admit the required quantity of air and gas (at the selected ratios) to supply the demand. The means mentioned comprises an automatically operable valve comprising a valve member 41 shown in Fig. 7 in the form of a hollow cylinder or tube of a diameter that slidingly fits within the sleeves 27, 28. As shown in Fig. 2, the valve 41, when in the lower-most position, closes both ports A and G. However, when the valve has been elevated from the lower-most position to the uppermost dotted line position shown in Fig. 2, the ports A and G are fully uncovered and hence will admit air and gas in the proportions determined by the arcuate adjustment of the sleeve, that is, in accordance with the relative areas of the valve openings.

In any intermediate position of the valve 41, the air and gas will be admitted in quantities determined by the elevation of the valve but in the relative ratios determined by the adjustment of the valve ports. Hence, if only one-half the maximum fuel supply capable of being delivered by the machine is required at a particular time, the valve 41 will have its lower edge disposed at an elevation whereby only the lower halves of the ports A and G will be uncovered. By this means a very simple valve arrangement is made possible both as to selecting the gas-air ratios and as to the control of the quantities of each fluid that are admitted in accordance with the demand for fuel.

The means for controlling the operation of the valve 41 comprises a flexible diaphragm 42 positioned in a chamber formed by casing members 43 and 44 between the flanged edge of which the diaphragm is clamped. The casing section 44 is provided with an air port 45 exposing the lower surface of the diaphragm to atmospheric pressure while the upper casing section 43 is provided with a port 46 exposing the upper surface of the diaphragm to the sub-atmospheric pressure that obtains in the casing 26 when the machine is in operation.

Extending from the diaphragm 42 is a rod 47 that passes into the interior of casing 26 and is attached to a cross-head 48 carried by the valve 41. As the diaphragm rises or falls in accordance with the suction effect of the compressor, the valve moves respectively toward open and closed positions, the extent of the valve movement depending on the suction (that is the pressure differential on opposed sides of the diaphragm) which corresponds to the demand for fuel. Thus, if during operation of the machine, some of the gas burners being supplied with fuel are turned off, the pressure of the gas in the duct 22 and outlet 21 of the compressor will tend to increase, which increase in pressure will actuate the pressure control 23 to increase the fuel flow through the by-pass duct 25 and reduce the suction effect in the duct 17 and thereby cause the diaphragm to move downwardly and effect the closure of the ports A and G an extent dependent on the drop in suction in the duct 17. Turning on additional burners reduces momentarily the pressure in duct 22, permitting the compressor to force more gaseous fuel into duct 22 from duct 17 and thereby, by reduction of pressure in the latter, to effect upward movement of the diaphragm and the opening correspondingly of the ports A and G.

In such opening and closing movements of the valve 41, the ratio of the air and gas admitted depends on the arcuate adjustment of the sleeve 27, while the position of the valve itself controls the total quantity of the fluids (air and gas) that enter through the ports to make up the fuel mixture.

It has been found that the streams of air and gas flowing through the opposed ports A and G into the casing 26, at least in some positions of the valve 41 or in some positions of adjustment of the sleeve 27, tend to interfere, one stream causing a diminished flow of the other stream and therefore a departure from the intended ratio of air and gas. Such interference of the flow of one stream by the other is avoided by the use of a baffle member indicated generally by the numeral 49. The baffle, as shown in Fig. 6 comprises curved vane sections 50 that are located in the casing 26 and extend from the bottom of the casing up to at least the level of the upper levels of the ports A and G.

The vanes at their rear edges, below the level of the stationary sleeve 28, contact the inner wall of the casing 26 and converge at the forward portion of the inner wall of the casing. Above the level of the lower edge of the stationary sleeve 28, the convergent front edge of the baffle vanes and the rear edges thereof are stepped or relieved inwardly to accommodate the sleeves 27 and 28 and also the valve 41 and to provide the clearance necessary for the adjustment of the sleeve 27 and reciprocation of the valve. The baffle preferably has a forward extension 51 within the adjacent end of the outlet duct 15, as shown in Fig. 6. This extension may be attached to the nipple 15 by welding or brazing and contacts the adjacent vertical edge of the member 49 when the latter is inserted in the chamber.

The baffle vanes or sections serve to stream-line the flow of air and gas from the respective ports A and G into the duct 15 where the streams commingle and mix in their passage to the compressor. By use of the baffle one stream entering through its port A or G does not impede the proper flow of the other stream through its respective port and thereby cause a proportioning of the fuel constituents (air-gas) different from that contemplated by the selected angular adjust of the sleeve 27 as indicated by the adjusting member 34.

In the particular form of the baffle illustrated, the vanes have secured thereto, as by welding or brazing, a tube 52 that constitutes a guide for the diaphragm operated rod 47. The tube is located between the vanes of the baffle and thus do not impede the smooth flow of either stream of air or gas within the proportioning chamber.

As above mentioned, the streams of air and gas entering the proportioning chamber provided by the casing 26 are initially directed downwardly toward the outlet duct 15. This downward flow of the fluids tends to sweep particles of foreign matter from the inner walls of the chamber and the curved guiding walls of the baffles or to prevent such matter from depositing on the walls. Some of the particles are carried with the streams into the duct 15 while the heavier particles tend to deposit in the trap 53 which is provided by spacing the outlet 15 above the level of the top wall of the diaphragm casing and from which trap the accumulated matter may be removed from time to time upon removal of the closure 26a of the casing 26.

The improved proportioning means shown and described for illustrative purposes is of simple construction, the valve 41 being essentially a section of seamless tubing having a piston-like sliding fit within the sleeve sections 27, 28. The latter also may be formed of seamless tubing. The angular adjustment of the upper section 27 by means of the exteriorly accessible means described, comprising the adjusting member 39, makes it possible to vary the air-gas ratio during operation of the machine to maintain the most desirable proportions of air and gas notwithstanding the fluctuations in the ratios of the constituents of the gas entering the proportioning chamber.

The valve member 41, in its up and down movements is guided primarily by the inner walls of the sleeves 27, 28 and its angular adjustment is not important since the bottom edge is in a single transverse plane normal to its axis. Hence guide pins or the like of the prior art for guiding the valve have been eliminated thereby avoiding binding action that prevents the free operation of the valve under actuation by the bellows.

While I have shown and described the preferred construction of the improved air-gas proportioning means for the purpose of illustration, it will be apparent that gaseous fluids other than air and fuel gas may be handled by the mechanism and that various changes in the details of the illustrated structure may be resorted to within the spirit of the invention.

I claim:

1. An air-gas proportioning device comprising a casing providing a chamber having inlets for air and gas, a pair of axially aligned cylindrical sleeves in the chamber each having complementarily shaped semi-cylindrical sections cooperating to provide ports therebetween for air and gas and each registering with one of said inlets, one of said sleeve sections being angularly adjustable within said chamber for inversely varying in equal degrees the intake capacities of the ports, and manually operable means for effecting adjustment of said adjustable sleeve section.

2. An air-gas proportioning device comprising a casing providing a chamber having inlets for air and gas, a pair of axially aligned cylindrical sleeves in the chamber each having complementarily shaped semi-cylindrical sections of less than 180° of arc and cooperating to provide ports therebetween for air and gas and each registering with one of said inlets, one of said sleeve sections being angularly adjustable within said chamber for inversely varying in equal degrees the intake capacities of the ports, and means comprising an exteriorly accessible manually operable actuating member for effecting the adjustment of said adjustable sleeve for varying the relative capacities of said ports.

3. In a gas mixing machine, an air-gas proportioning member providing a chamber with inlets for air and gas, a pair of relatively rotatable cylindrical sleeves in said chamber having semi-cylindrical portions cooperating to provide air and gas ports disposed in registration with said air and gas inlets respectively for controlling the flow of air and gas into said chamber, and manually operable means comprising a member extending into said air inlet for effecting relative adjustment of said sleeves for varying the relative capacities of said ports and provided with a manually operable actuating member positioned exteriorly of said proportioning member.

4. In a gas-mixing machine, an air-gas proportioning member providing a chamber with inlets for air and gas, a fixed cylindrical sleeve member in said chamber, an angularly adjustable cylindrical sleeve in said chamber, said sleeves being coaxially arranged and having longitudinally extending semi-cylindrical portions cooperating to provide air and gas ports therebetween each in registration with one of said inlets for controlling the flow of air and gas through the same, and manually operable means comprising a member extending from said adjustable sleeve into said air inlet for effecting angular adjustment of said adjustable sleeve for inversely varying the capacities of said ports.

5. In a gas-mixing machine, an air-gas proportioning member providing a chamber with inlets for air and gas, a fixed cylindrical sleeve member in said chamber, an angularly adjustable cylindrical sleeve in said chamber, said sleeves being coaxially arranged and having longitudinally extending semi-cylindrical portions cooperating to provide air and gas ports therebetween each in registration with one of said inlets for controlling the flow of air and gas through the same, and means for effecting angular adjustment of said adjustable sleeve for inversely varying the capacities of said ports, said means comprising an operating arm extending from said adjustable sleeve through one of said inlets and manually operable means for swinging said arm.

6. In a gas-mixing machine, an air-gas proportioning member providing a chamber with inlets for air and gas, a pair of cylindrical sleeves in said chamber one being adjustable angularly relative to the other, said sleeves being coaxially arranged and having longitudinally extending semi-cylindrical portions cooperating to provide air and gas ports therebetween in registration respectively with said air and gas inlets, means for effecting angular adjustment of said adjustable sleeve for enlarging the area of one of the ports and reducing equally the area of the other to accommodate the flow of air and gas therethrough in selected ratios, and a reciprocable valve in said sleeves operable to positions for controlling the rate of flow of air and gas through the respective ports at said selected ratios.

7. Means for volumetrically proportioning the flow of air and gas from respective equi-pressure sources to a common duct comprising a casing providing a chamber having inlets for the gas and air communicating with said sources and an outlet communicating with the common duct, a stationary cylindrical sleeve and an angularly adjustable sleeve in said casing having complementarily shaped longitudinally extending semi-cylindrical portions providing ports therebetween each in registration with one of said inlets, means for adjusting said adjustable sleeve angularly for inversely varying in equal degrees the areas of the respective ports for predetermining the ratio of the flow of air and gas into the casing and to said outlet and duct, and a slidable valve in said sleeves operable over said ports to positions for controlling the rate of flow of air and gas through the respective ports at the selected ratios.

8. An air-gas proportioning device comprising a casing providing a chamber having an outlet for air and gas and spaced apart individual inlets for air and gas, proportioning means in said chamber comprising an adjustable member providing ports of inversely variable capacity each adjustable from and to open and closed relations in registration with one of said inlets whereby air and gas are admitted into the chamber in selected ratios, a tubular valve operable within said means for controlling the rate of flow of air and gas through the respective ports at the selected ratios, and a longitudinally extending baffle member in said chamber having walls convergent at one edge along a line vertically bisecting said outlet and having the opposite edges spaced apart and disposed between said ports for maintaining the incoming air and gas as individual streams in the passage thereof into said outlet, said outlet being located at an elevation lower than said ports whereby said air and gas streams exert a scavenging action on the confining surfaces within the chamber for inhibiting the deposition of foreign particles thereon.

9. An air-gas proportioning device comprising a casing providing a cylindrical chamber having opposed inlets for air and gas, a fixed cylindrical lower sleeve section in said chamber having a semi-cylindrical upstanding portion, an angularly adjustable upper sleeve section in the chamber of the same internal diameter as the lower section and provided with a depending semi-cylindrical section corresponding in axial extent to the upstanding portion of said fixed sleeve section, said semi-cylindrical portions having a total angular length less than 360° whereby said sleeve sections provide therebetween inlet ports for air and gas having a fixed total area, means for effecting angular adjustment of said upper sleeve section for increasing laterally the area of one port while decreasing laterally the area of the other port equally for predetermining the ratio of the intake capacities of the ports, and an axially slidable valve within said sleeves movable to positions for varying the rate of flow of air and gas through the respective ports at the predetermined ratios.

ERNST A. FURKERT.

REFERENCES CITED

The following references are of record in the file of this patent:

UNITED STATES PATENTS

| Number | Name | Date |
|---|---|---|
| 946,737 | Riotte | Jan. 18, 1910 |
| 1,036,133 | McKee | Apr. 20, 1912 |
| 1,375,265 | Turner | Apr. 19, 1921 |
| 1,980,770 | Thomas | Nov. 13, 1934 |
| 2,243,704 | Hess | May 27, 1941 |